(12) United States Patent
Cajolet (10) Patent No.: US 6,192,388 B1
(45) Date of Patent: *Feb. 20, 2001

(54) DETECTING AVAILABLE COMPUTERS TO PARTICIPATE IN COMPUTATIONALLY COMPLEX DISTRIBUTED PROCESSING PROBLEM

(75) Inventor: Claude Cajolet, Montreal (CA)

(73) Assignee: Avid Technology, Inc., Tewksbury, MA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/667,837

(22) Filed: Jun. 20, 1996

(51) Int. Cl.[7] ....................................... G06F 9/00
(52) U.S. Cl. ..................... 709/100; 709/102; 709/105
(58) Field of Search ..................... 395/670, 261, 395/672, 673, 674, 701, 704; 709/100, 102, 103, 104, 105, 108

(56) References Cited

U.S. PATENT DOCUMENTS

| | | | |
|---|---|---|---|
| 4,954,945 | * | 9/1990 | Inoue .................................... 709/105 |
| 5,053,950 | * | 10/1991 | Naganuma et al. ................. 709/105 |
| 5,072,376 | * | 12/1991 | Ellsworth ............................. 395/650 |
| 5,155,858 | * | 10/1992 | DeBruler et al. .................... 709/105 |
| 5,202,989 | * | 4/1993 | Hirosawa et al. ................... 709/105 |
| 5,325,526 | * | 6/1994 | Cameron et al. .................... 395/650 |
| 5,490,271 | * | 2/1996 | Elliott et al. ........................ 395/650 |
| 5,524,247 | * | 6/1996 | Mizuno ............................... 710/200 |
| 5,675,739 | * | 10/1997 | Eilert et al. ...................... 395/200.11 |

* cited by examiner

*Primary Examiner*—Majid Banankhah
(74) *Attorney, Agent, or Firm*—Wolf, Greenfield & Sacks, P.C.

(57) ABSTRACT

A complex computational task is processed by a plurality of computers coupled to a network. A plurality of different computers (64–74) are each assigned a different portion of a distributed processing task by a problem dispatcher (88). Each computer determines if a local operator has not used a keyboard (43) or a mouse (40) for a predefined period of time. If not, a screen saving program is initiated and the computer begins monitoring the network to determine if a request for participation in a distributed processing task has been transmitted. Upon receiving such a request, the screen saver program responds, indicating that the computer is available to participate in the task. Each computer also sends characteristics to the problem dispatcher, which selects assistant computers to participate in the task. The problem dispatcher assigns specific portions of the task to each of the assistant computers until the task is completed. If a local operator interrupts, the portion of the task being processed by that computer is assigned to a different assistant computer. In this manner, the complex computational task is processed relatively quickly using only those computers that are available and have the appropriate capabilities.

32 Claims, 5 Drawing Sheets

| DETERMINING INTEREST VALUE FOR RESPONDENT |
|---|
| $IV = C(AT) * C(SM) * C(CT) * C(RM)$ |
| WHERE: <br>     IV IS THE INTEREST VALUE; <br>     C() IS THE CONTRIBUTION FUNCTION <br>     AT IS THE AVERAGE IDLE TIME FOR THE ASSISTANT <br>     SM IS THE AMOUNT OF SWAP MEMORY <br>     CT IS THE COMPUTER TYPE <br>     RM IS THE AMOUNT OF RAM MEMORY |

DETECTING AVAILABLE COMPUTERS TO PARTICIPATE IN COMPUTATIONALLY COMPLEX DISTRIBUTED PROCESSING PROBLEM

FIELD OF THE INVENTION

This invention generally pertains to a distributed processing environment in which a plurality of computers connected in a network are each assigned a portion of a problem, and more specifically, pertains to the selection of available computers to participate in the distributed processing of a computationally complex problem.

BACKGROUND OF THE INVENTION

There are many types of problems that are so computationally complex as to require hours of computation by one of the currently available personal computers or workstations in a network. One example of such a complex problem arises in the rendering of three-dimensional (3D) images, which may require many calculations to determine the lighting and color applied to each pixel in the rendered image. The complexity of the problem multiplies when producing an animation that requires a number of scenes to be rendered. Although a single computer can eventually carry out all of the calculations required to render a single image or even a plurality of images for an animation, it has been recognized that the task can be handled much more efficiently in a distributed processing environment in which the problem is divided into parts for solution by a plurality of computers. Typically, the computers used in a distributed processing environment are linked directly together, e.g., in a rack at one location, or alternatively (and perhaps more commonly), linked to one or more servers in a network— either local or wide area. It should be noted that the term "computer" as used herein is intended to include personal computers, portable computers, and workstations having a processing capability.

In a dedicated distributed processing environment, all of the plurality of computers linked together are normally available to share a problem solving task. However, it is often not practical to dedicate several computers to solving only distributed processing tasks. More commonly, the computers will be connected in a network and reside at different locations throughout an office or in different geographic locations. However, when the computers are used locally, they will not be available for use in solving a distributed processing problem. Furthermore, in most cases, not all of the computers connected in a network will have equivalent computational capabilities or access to the same software, and thus, will not all be usable in solving every type of complex problem.

Typically, it is necessary for someone to specifically create a list identifying the computers connected in a network that should be used in a distributed processing task. If any of the computers listed is in use by another party when a distributed processing task is to be initiated, the list must be modified. Since some of the computers that might be used are likely not in the same office area and thus not visible to the person making the list, it is not a trivial problem to determine which of the listed computers that might be used is actually available.

The list of computers that can participate in the distributed solution of a problem should be based upon the computers' known capabilities. While the amount of memory, type and speed of processor, size of hard drive, software installed or accessible, and other relevant parameters for each computer that might be used can be tabulated and considered when making a list of the computers that will participate in solving a problem, it is likely that such information will quickly become outdated as changes are made to computers connected to a network. If software necessary to solve a distributed processing problem that was once installed on a computer is deleted, it is inefficient to attempt to assign part of the distributed processing task to that computer, since that portion of the task assigned to it cannot be completed.

Thus, there are several problems that arise when using a plurality of computers to solve a task in a distributed processing environment, which have not been resolved in the prior art. Specifically, it would be preferable for a controlling computer that is initiating a distributed processing task to automatically determine which computers on a network are available for use. In addition, it would be desirable to automatically determine the capabilities of each available computer so that only those capable of solving the problem, and perhaps of those, only the best are selected to participate. A further advantage of automating these tasks is that the problem being solved can be scheduled when most of the computers on the network are otherwise inactive, such as during lunch or overnight. The distributed processing problem and the control of the tasking should optionally be initiated within an application from which the problem derives. For example, a 3D rendering program might include the option to initiate the distributed processing of a scene or animation rendering problem using available computers on a network. Key provisions in such a system would be identifying the computers that are not being used by other operators and determining the computational parameters of such computers.

SUMMARY OF THE INVENTION

In accordance with the present invention, a method for automatically selecting computers on a network from among a plurality of interconnected computers to solve a portion of a computational task initially comprises the step of transmitting a tasking signal over the network, indicating that the computational task requires solving. Each of the plurality of interconnected computers is enabled to determine if it has not been used by a local operator for more than a predefined time interval. If not, the computer transmits a response signal indicating that the computer is available for solving the computational task. A different portion of the computational task is then assigned for execution by assisting computers that are selected from each of the plurality of interconnected computers from among those that have transmitted the response signal.

The step of enabling each of the plurality of interconnected computers to determine if it has not been used by a local operator for more than the predefined time interval is preferably carried out by executing a screen saver program on each of the plurality of interconnected computers. The screen saver program is activated to change a monitor display after the local operator has not used the computer for the predefined time interval. When thus activated, the screen saver program monitors the network to detect the tasking signal, and in response thereto, to transmit the response signal.

Any computer transmitting the response signal preferably also transmits data defining computational capabilities of the computer. The method then further preferably includes the step of selecting the assisting computers as a function of the data defining the computational capabilities of the computers transmitting the response signal. The assisting computers are selected from among the computers transmitting the response signal so as to ensure that the portions of the task are executed by the assisting computers with at least a minimal predetermined efficiency. The computational capabilities provided in the data include information specifying an average idle time, the amount of memory available to execute the portion of the task, and/or a type designation for the computer. The memory parameter can specify the random access memory (RAM) available and the size of the swap file available, and the type designation can indicate the type of processor and its clock speed.

The local operator at any assisting computer is enabled to interrupt execution of the portion of the task assigned to one of the assisting computers in order to use that computer. The portion of the task that was interrupted is then subsequently assigned to a different assisting computer.

The assisting computers each transmit an indication that the portion of the computational task assigned to them for execution has been completed. A different portion of the task can then be assigned to each assisting computer until the entire task is complete.

In a preferred form of the invention, one of the plurality of connected computers comprises a dispatcher that initiates the computational task, selects the assisting computers, and assigns the execution of each portion of the task to the assisting computers. The task may be any computationally complex task, such as rendering an image.

Other aspects of the present invention are directed to a method for automatically determining whether a computer connected to a network of computers is available for assisting in solving a computational task, and to a method for automatically selecting specific computers connected to a network to assist in solving a computational task. The steps of these methods are generally consistent with the above discussion.

Yet another aspect of the present invention is directed to an article of manufacture that is adapted to be used in connection with a plurality of computers coupled to a network. The article includes a nonvolatile memory device on which are stored a plurality of machine instructions, which when executed by the computers, effect a plurality of functions generally consistent with the step of the method discussed above. A system for effecting distributed processing of a computational task on a network is still another aspect of the present invention.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
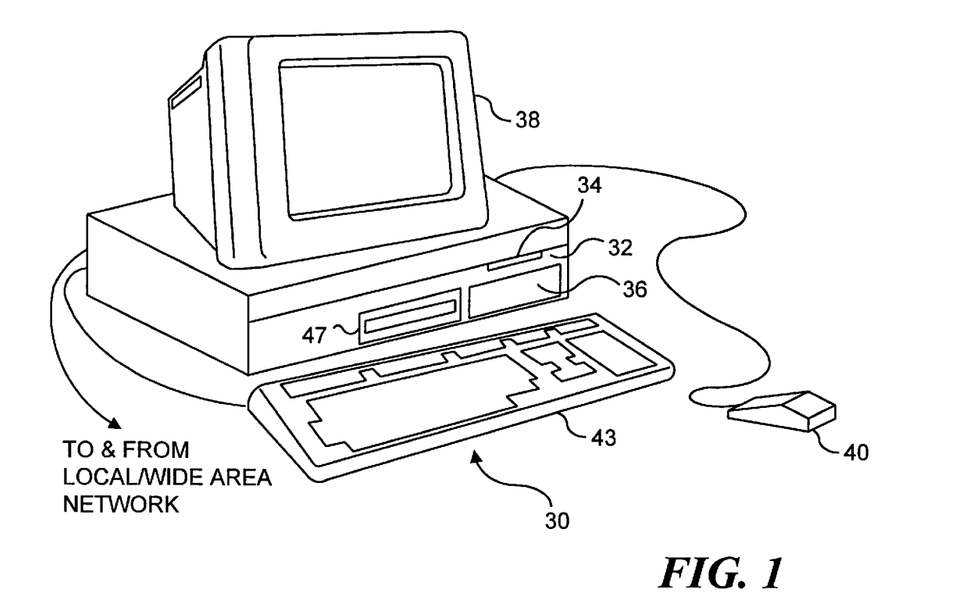
FIG. 1 is an isometric view of a personal computer suitable for use in implementing the present invention.

With reference to FIG. 1, a generally conventional personal computer 30 is illustrated, which is suitable for use in connection with practicing the present invention. Alternatively, a laptop or a workstation may instead be used. Personal computer 30 includes a processor chassis 32 in which are mounted a floppy disk drive 34, a hard drive 36, a motherboard populated with appropriate integrated circuits (not shown), and a power supply (also not shown), as are generally well known to those of ordinary skill in the art. A monitor 38 is included for displaying graphics and text generated by software programs that are run by the personal computer. A mouse 40 (or other pointing device) is connected to a serial port (or to a bus port) on the rear of processor chassis 32, and signals from mouse 40 are conveyed to the motherboard to control a cursor on the display and to select text, menu options, and graphic components displayed on monitor 38 by software programs executing on the personal computer. In addition, a keyboard 43 is coupled to the motherboard for user entry of text and commands that affect the running of software programs executing on the personal computer.

Personal computer 30 also optionally includes a compact disk-read only memory (CD-ROM) drive 47 into which a CD-ROM disk may be inserted so that executable files and data on the disk can be read for transfer into the memory and/or into storage on hard drive 36 of personal computer 30. For use in connection with the present invention, personal computer 30 is coupled to a local area and/or wide area network and is one of a plurality of such computers on the network. In addition, for purposes of this description of the present invention and as used in the claims, the term "network" includes a plurality of computers located at disparate points that are electronically coupled together in communication with each other, e.g., by a conventional modem or cable modem, via integrated services digital network (ISDN) links, or through any other type of links.

Figure 2:
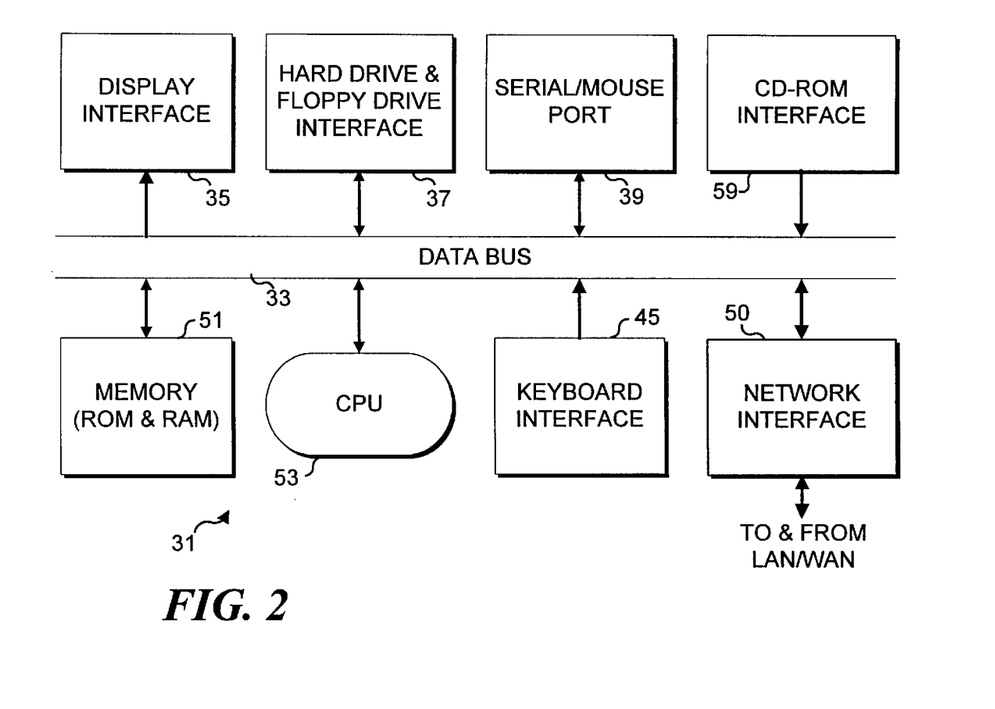
FIG. 2 is a schematic block diagram of components included within a processor chassis of the personal computer shown in FIG. 1.

Although details relating to all of the components mounted on the motherboard or otherwise installed inside processor chassis 32 are not illustrated, FIG. 2 is a block diagram illustrating some of the functional components that are included. The motherboard includes a data bus 33 to which these functional components are electrically connected. A display interface 35, comprising a video graphics accelerator card, for example, generates signals in response to instructions executed by a CPU 53 that are transmitted to monitor 38 so that graphics and text are displayed on the monitor. A hard drive and floppy drive interface 37 is coupled to data bus 33 to enable bidirectional flow of data and instructions between data bus 33 and floppy drive 34 or hard drive 36. Software programs executed by CPU 53 are typically stored on either hard drive 36, or on a floppy disk (not shown) that is inserted into floppy drive 34. The software programs comprising the present invention and associated with a computational task that will be solved by a distributed processing environment comprising the network by which the plurality of computers are linked will likely be distributed either on such a floppy disk, on-line via a modem, or on a CD-ROM disk; these programs are normally stored on hard drive 36 for execution by CPU 53 in each computer prospectively participating in the solution of the problem.

A serial/mouse port 39 (representative of the two serial ports typically provided) is also bidirectionally coupled to data bus 33, enabling signals developed by mouse 40 to be conveyed through the data bus to CPU 53. Alternatively, if a different device such as an external modem (not shown) is coupled to one of the serial ports, data can be transmitted bidirectionally from the CPU to the modem. A CD-ROM interface 59 connects CD-ROM drive 47 to data bus 33. The CD-ROM interface may be a small computer systems interface (SCSI) type interface or other interface appropriate for connection to and operation of CD-ROM drive 47.

A keyboard interface 45 receives signals from keyboard 43, coupling the signals to data bus 33 for transmission to CPU 53. Also coupled to data bus 33 is a network interface 50 (which may comprise, for example, an Ethernet card for coupling the personal computer to a local area and/or wide area network). Data used in connection with the present invention may be stored on a server and transferred to personal computer 30 over the network to carry out the solution of the task.

When a software program is executed by CPU 53, the machine instructions comprising the program that are stored on a floppy disk, a CD-ROM, or on hard drive 36 are transferred into a memory 51 via data bus 33. Machine instructions comprising the software program are executed by CPU 53, causing it to implement functions determined by the machine instructions. Memory 51 includes both a non-volatile read only memory (ROM) in which machine instructions used for booting up personal computer 30 are stored, and a random access memory (RAM) in which machine instructions and data are temporarily stored when executing application programs. FIG. 2 only illustrates a single CPU; however, it will be apparent that computers using multiple CPUs are currently available and are likely to become increasingly more common. Multiple CPUs in a computer enable much greater efficiency to be applied in executing certain types of computational problems than are possible using a single such CPU. Accordingly, it is likely that computers having multiple CPUs will often be preferred for use to assist in executing a distributed processing task, compared to computers with only a single such CPU.

For a first preferred embodiment of the present invention, the option to initiate solution of a computational task by the distributed processing environment will likely be included in a 3D rendering and graphics program. Due to the size and number of the files comprising this software program, it will preferably be distributed on CD-ROM, but may alternatively be distributed on floppy disks. One of the computationally complex tasks that would greatly benefit from solution by a plurality of computers is the rendering of one or more images developed by this program. If a single image is being rendered, it can be divided into tiles of the same or different sizes, and each tile can be assigned to one of the computers coupled to the network that has not been used by a local operator for a predefined period of time. When assigned a portion of the rendering task, a computer is referred to as an assisting computer. If an animation is being rendered, each image frame in the animation may be assigned to a different one of the assisting computers on the network. In either case, distribution of the computational tasks to more than one computer on the network greatly speeds the rendering process compared to the alternative, which is to execute the task on only a single computer.

Figure 3:
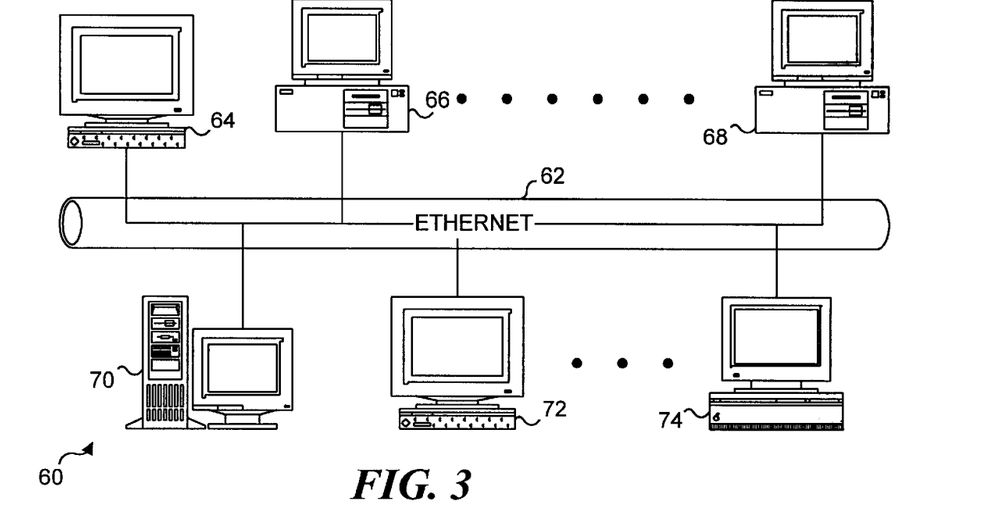
FIG. 3 is a schematic diagram of a portion of an Ethernet local area network, showing a plurality of computers coupled together on the network.

An example of a local area network 60, which is based upon an Ethernet connection 62 between a plurality of different computers is illustrated in FIG. 3. Although only computers 64, 66, 68, 70, 72, and 74 are illustrated in this FIGURE, it will be apparent that many more computers may be included in local area network 60 and coupled together through Ethernet link 62 to assist in solving a computationally complex task. Still more computers may be coupled together in a wide area network (not specifically shown). As noted above, for purposes of the preferred embodiment and as an example of such a task, it will be assumed that computer 66 is initiating the rendering of an image using a 3D graphics program. Although computer 66 could render the image without any assistance from other computers on the network, using the present invention, it can relatively easily determine which computers coupled together through Ethernet link 62 on local area network 60 (and/or on a wide area network) that are available to assist in rendering the image.

While it is likely that some of the computers coupled into the network will not have the capacity to participate in rendering an image, because of inadequate hardware resources or because they lack software necessary to carry out the task, it is likely that a number of computers are capable of assisting and are available for such use because they are currently not being used by a local operator. An important aspect of the present invention is its capability of determining which computers coupled to local area network 60 have not been used by a local operator for at least a predefined time and are thus available to assist, assuming the computers have the hardware and software capability. In addition, the present invention enables any computer on the network, such as computer 66, which is making a request for assistance in solving a task, to select specific computers from among those computers that are available to assist in the task, so as to achieve at least a minimum efficiency in solving the task.

In the example described above, computer 66 differs from the other computers in that it is currently running the 3D software. This difference is indicated by a dash block 82 in FIG. 4. Because it is executing this software, which has access to options enabling the operator running the software to initiate a distributive processing task, computer 66 becomes a problem dispatcher 88. In contrast, any computer selected to assist in the problem solving must have access to and be able to execute at least the software necessary to render an image, as represented by a dash line 80. In connection with determining whether such computer is available to assist in solving a task, each of the computers that might be used includes a special screen saver program 84. If selected to assist in the task, that computer becomes a problem solving assistant 86.

Figure 4:
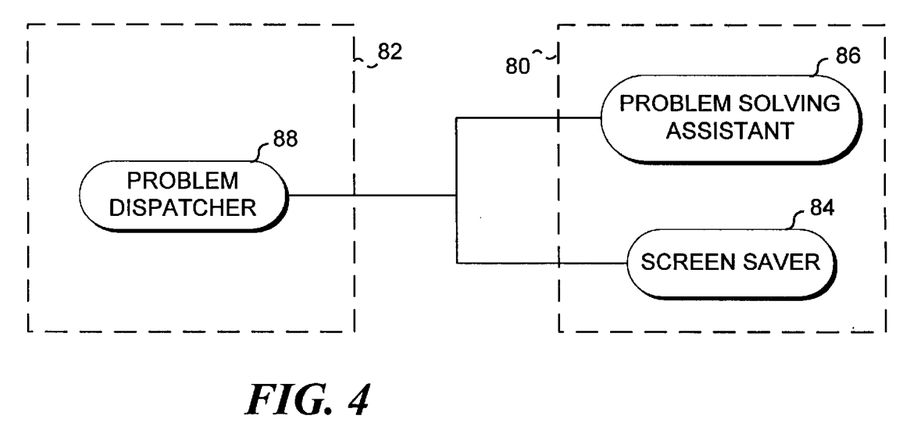
FIG. 4 is a functional block diagram showing a dispatcher and one of the assisting computers that is participating in solving a computational task, in accord with the present invention.

In the preferred embodiment of the present invention, each of the plurality of computers comprising the network uses a special screen saver program to determine if it has not been used by a local operator for a predefined period of time. As those of ordinary skill in the art will be aware, a screen saver typically monitors the activity of input devices such as keyboard 43 and mouse 40. If a local operator has not moved mouse 40, depressed a mouse button, or input any alphanumeric characters using keyboard 43 for a predefined period of time, a typical screen saver program responds to the apparent lack of activity by the local operator by changing the image displayed on monitor 38. The change may be simply to blank the screen display or may involve displaying a graphic or bitmap image that changes over time. If a screen saving program is not used, any image that is displayed continuously on monitor 38 for an extended period of time may be permanently burned into the phosphor coating on the monitor display screen so that even when the image is not electronically applied to the monitor, it continues to persist, degrading any other image supplied to monitor 38. The screen saving program is set to change the image either continually or periodically to prevent any image displayed from being burned into the phosphor coating of the monitor screen.

Newer energy saving monitors are controllable in response to a signal provided by the computer to which they are connected so that after a predefined period of user inactivity, the screen on the monitor is blanked and the monitor enters a standby mode. It is also possible to have the computer de-energize such a monitor after a predetermined period of inactivity by a local operator at the computer. Such monitors will not require a conventional screen saving program to prevent image burn-in of the phosphor coating of the monitor. In addition, certain types of monitors use display screens that are not subject to burn-in. Accordingly, although the following discussion addresses the use of a special screen saving program to determine when a computer has not been used by a local operator for a predefined period of time, it is contemplated that the present invention is generally usable in connection with any program running on a computer that is able to detect an inactive status of the computer, indicating that the computer is available to participate in solving a distributed processing task.

Figure 6:
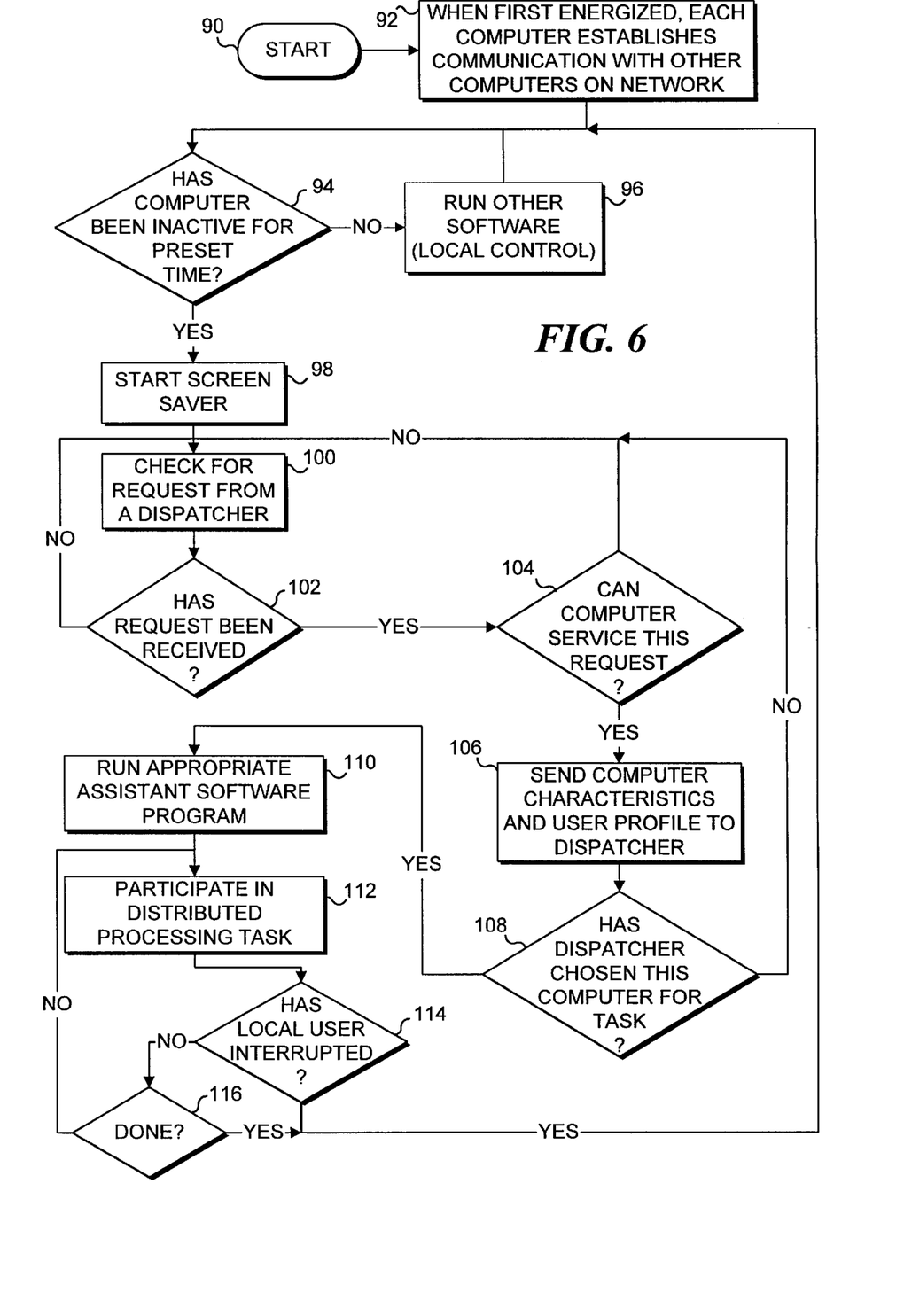
FIG. 6 is flow chart illustrating the logical steps implemented by each computer on the network that may participate in solving the computational task.

In connection with one preferred embodiment of the present invention, the special screen saving program indicated by screen saver 84 has further functions associated with it. After initiating the conventional screen saving function following a predefined period of inactivity by the local operator, the special screen saving program begins monitoring the network for any request that has been made by problem dispatcher 88 for assistance in solving a computational task. Since the computer on which the screen saver is running has not been used for the predefined period of time, the computer will likely be available to assist in solving the computational task for which a request has been made. The remaining issues to be resolved before the computer is assigned a portion of the computational task depend upon its capabilities to render the required assistance, compared to other computers that are also available. The logical steps implemented by the special screen saving program in connection with responding to a request for assistance in solving a task that is received from problem dispatcher 88 are illustrated in FIG. 6.

Beginning with a start block 90, a block 92 indicates that when first energized, each computer establishes communication with all the other computers on the network. This step typically occurs during boot-up of the computer when the appropriate network software is executed by the computer. In a decision block 94, the special screen saving program determines if the computer has been inactive for a preset or predefined time. Typically, the predefined time is selected by the local operator based upon that individual's working habits, but generally ranges from ten minutes to an hour. If the computer on which the special screen saving program (or other program that detects the computer inactivity) is running has not been inactive for the predefined time, the logic proceeds to a block 96, wherein the computer either continues to run other software under control of a local operator or remains available to run such software. The presumption in this case is that the local operator is more likely to begin reusing the computer at any time if only a short time (less than the predefined period of inactivity) has expired since the local operator last used one of the input devices. The loop through decision block 94 and block 96 continues until the screen saver program determines that the computer has been inactive for the predefined period of time. The logic then proceeds to a block 98 in which the screen saver aspect of the program is initiated, causing the image displayed on the monitor of the computer to be changed and to continue to change periodically, thereby protecting the phosphor coating on the display screen.

In a block 100, the screen saver program checks for a request from any other computer on the network that is acting as a problem dispatcher. In a decision block 102, the screen saver program determines if a request for assistance in solving a computational task has been received from such a problem dispatcher. If not, the logic continues looping through block 100. While the screen saver is functioning, if a request to assist is received from a problem dispatcher on the network, the logic proceeds to a decision block 104. In this decision block, the logic determines if the computer that is inactive can service the request. The step illustrated in decision block 104 may be optional if the computational tasks for which assistance may be requested can be satisfied by all computers on the network, even if some have greater computational capabilities and can provide more efficient assistance than others. If the computer is unable to service the request, for example, because it lacks access to the necessary software required, the logic again returns to block 100. However, if the computer has the capability, at least at some level, to participate in the solution of the computational task, the logic proceeds to a block 106. In this block, the computer sends its computational characteristics and user profile to the dispatcher. Details of these parameters that are transmitted to the problem dispatcher in the preferred embodiment are disclosed below.

The purpose of transmitting the computational characteristics and user profile is to enable the problem dispatcher to select the assisting computers from among those that are available, for participating in the distributed processing problem. Optimally, only assisting computer are selected that will achieve at least a minimal level of efficiency in the solution of the task. Accordingly, by evaluating the computational characteristics and user profile data transmitted to it by each of the available computers on the network, the problem dispatcher can make a selection of the computers to assist in the solution of the computational task.

Not shown in FIG. 6 are the steps implemented by the problem dispatcher in response to this data transmitted by each of the available computers on the network. A decision block 108 determines if the problem dispatcher has chosen this computer to assist in solving the task. If not, the logic returns to block 100, to await a request from a different problem dispatcher (or reactivation of the computer in response to an action of the local operator). Otherwise, the logic proceeds to a block 110 so that the assisting computer selected by the problem dispatcher can run the appropriate software program needed to solve the assigned portion of the task. In the example presented above, the task is rendering an image. Accordingly, in order to render an image, the selected assistant computer must run the 3D program used for rendering images. In addition, the assistant computer must receive the data from the problem dispatcher that are required for input to this 3D rendering program to produce the rendered image (or portion thereof).

A block 112 notes that the assisting computer is participating in the distributed processing task. This block indicates that the rendering process is implemented for the assigned portion of the image, or if an animation is being rendered, for the assigned image frame. A decision block 114 determines if the local user or operator has interrupted the process. If not, a decision block 116 determines if the assisting computer has completed its portion of the distributed processing task. If not, the logic loops back to block 112 to continue processing of the portion of the task assigned to the assisting computer.

It should be noted that at any time after block 98 in the logic process disclosed in FIG. 6, the local operator can interrupt the flow of logic by initiating local use of the computer, e.g., by moving mouse 40, depressing a mouse button, or entering a keystroke on keyboard 43. Accordingly, decision block 114 is provided to indicate that the local operator has ultimate control on the use of the computer. If the local operator interrupts the computer's contribution to the distributed processing task, the logic returns to decision block 94 to enable the local operator to run software under local control, as indicated in block 96. When the local operator interrupts a portion of the distributed processing task assigned to the computer, that portion must be reassigned by the problem dispatcher to another next available assisting computer.

Figure 7:
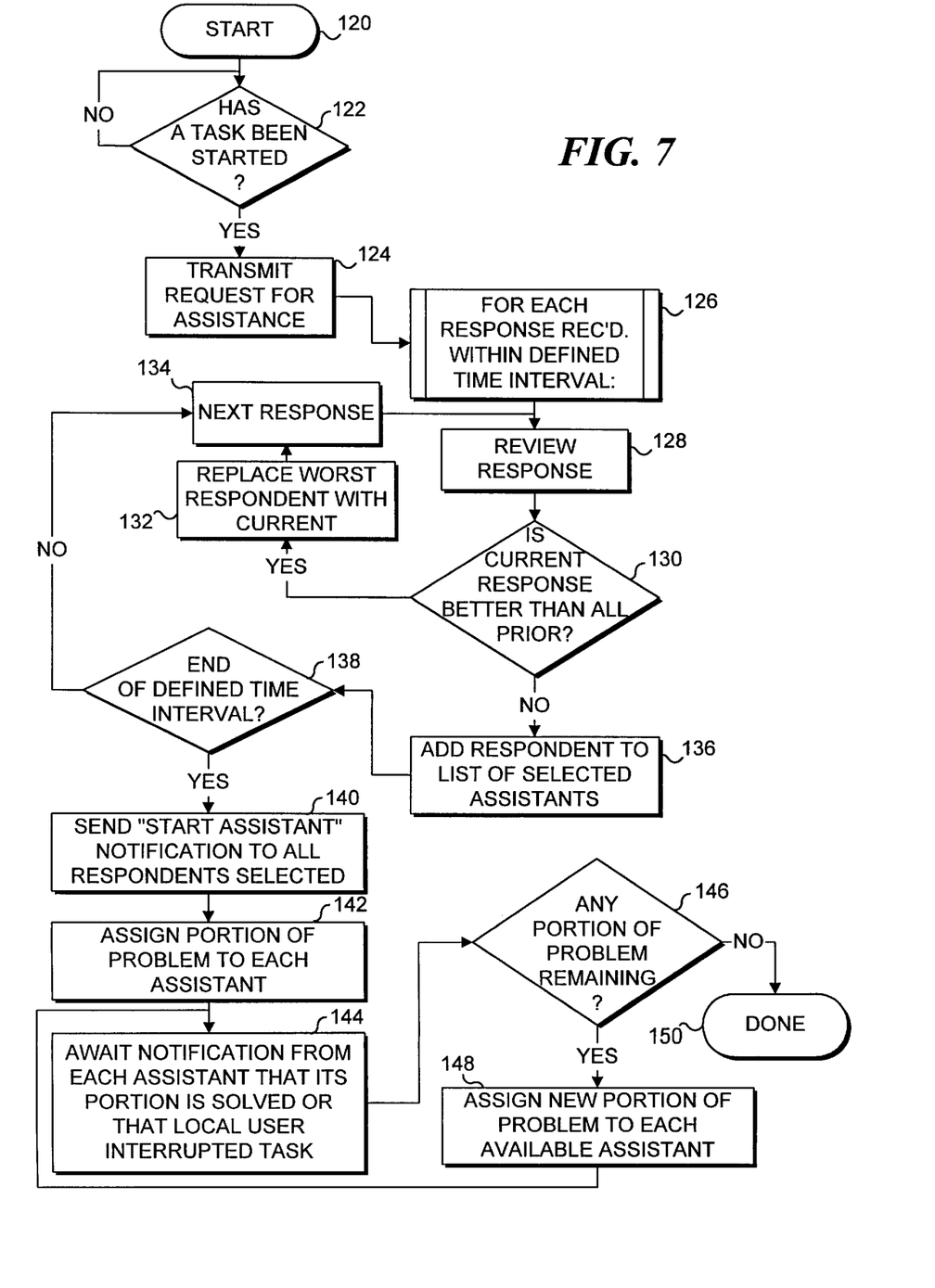
FIG. 7 is a flow chart showing the logical steps implemented by the dispatcher in selecting and managing the assisting computers.

Instead of running a portion of the task, the program dispatcher manages the distributed processing system. As shown in FIG. 7, beginning with a start block 120, the problem dispatcher, i.e., the software program in which the functions of the problem dispatcher are executed, initially determines if a task has been started in a decision block 122. This step corresponds to detecting a specific menu selection by a local operator using the computer that serves as the program dispatcher. The flow of logic begins if this local operator chooses a menu option to render either an image or an animation using distributed processing. Once such a task has been started, the logic proceeds to a block 124 in which the problem dispatcher transmits a request for assistance over the network to solicit the participation of available computers that have not been used by their local operators for at least the predefined period of time and which have the capacity to participate in solving the problem. As noted above, the special screen saving program running on the computers determines whether a computer connected to the network has not been used for the predefined period of time by its local operator and monitors the network so that it can detect the request for assistance, which is transmitted by the problem dispatcher, as noted in block 124. Further, the computers that are available transmit a response back to the problem dispatcher to indicate their availability to participate.

In a block 126, the problem dispatcher initiates a series of steps for each response that is received within a defined time interval. The first of these steps is to review each response, as indicated in a block 128. A decision block 130 determines if the current response is better than all previous responses. If so, the logic replaces the worst previous respondent with the current respondent in a list of those prospectively selected to assist in the distributed processing task, as indicated in a block 132. A block 134 then provides for processing the next response received from the other computers on the network. This response is reviewed in block 128. The determination of whether a current response is better than all the previous responses received is based on an "interest value" associated with each respondent, which is determined as explained below. A negative response to decision block 130 leads to a block 136, wherein the current respondent is added to the list of selected assistants.

Thereafter, a decision block 138 determines if the end of the defined time interval in which available computers should have transmitted a response to the request for assistance has been reached, and if not, the logic proceeds to block 134 so that the problem dispatcher can consider the next response received over the network. However, if the time interval for receiving responses has elapsed, a block 140 sends a "start assistant" notification to all of the respondents that have been added to the list of selected assisting computers. This notification prompts each of the assisting computers to load the required software necessary to complete the portion of tasks that they will be assigned. In a block 142, the problem dispatcher assigns a portion of the computational problem to each of the assistant computers. In this step, the data that must be input to the 3D graphics program to render the portion of the image (or an entire image which is a portion of an animation) are transmitted to each of the assisting computers over the network so that they can carry out their portion of the overall rendering process.

A block 144 indicates that the problem dispatcher must await notification from each of the assisting computers that its portion of the task has been solved, or alternatively, that the local operator who normally uses one of the assisting computers has interrupted the assigned portion of the task being executed by that assisting computer. In the event that the local operator has interrupted execution of a portion of the task, that portion is assigned to one of the next available other assisting computers. In block 144, after an assisting computer has completed its portion of the task, it returns the rendered image data for a portion of a frame, or for a rendered frame, to the problem dispatcher. The problem dispatcher assembles the returned image or frame data in the appropriate file or files used for storing the output of the rendering task. A decision block 146 determines if any portion of the problem remains unsolved, including portions of the problem that were interrupted because the local operator has assumed control of an assisting computer, interrupting the portion of the task to which it had been assigned. If so, a block 148 provides for assigning any uncompleted portions of the task to each successively available assisting computer. Thereafter, the logic loops back to block 144. Once all portions of the task have been solved, a block 150 terminates the process.

Figure 5:
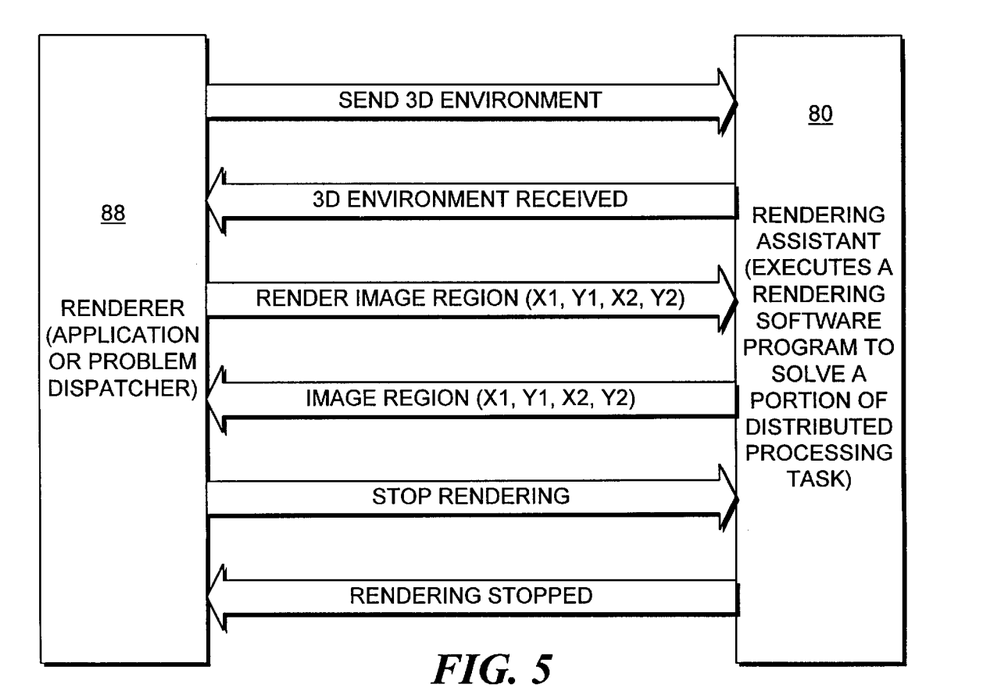
FIG. 5 is a schematic block diagram that generally illustrates the steps and information exchanged between the dispatcher and each of the assisting computers.

Further details on the data and signals that are exchanged between problem dispatcher 88 and rendering software 80 running on each assisting computer are illustrated in FIG. 5. Problem dispatcher 88 comprises the application that creates the problem dispatcher. After all of the assisting computers are selected to participate in the distributed problem, problem dispatcher 88 sends the 3D environment data to rendering software 80, i.e., to each of the assisting computers. The data transmitted by the problem dispatcher comprise all of the information required as input to enable a rendering software 80 to carry out its assigned portion of the distributed processing task. Rendering software 80 transmits a signal back to problem dispatcher 88 indicating that all of the data have been received. Next, problem dispatcher 88 sends the image region, which is defined by the x and y coordinates of two opposite corners of the region to rendering software 80 to define the portion of a frame which must be rendered by the rendering assistant. After the rendering assistant completes the rendering of this portion of the image region, it transmits the rendered data for the image region back to problem dispatcher 88. If another portion of the region remains to be rendered, problem dispatcher 88 again transmits that to rendering software 80. However, if no other portions of the image remain to be rendered, problem dispatcher 88 transmits a "stop rendering" signal to rendering software 80. In response, rendering software 80 returns a signal to problem dispatcher 88, indicating that the rendering has been terminated.

Figure 8:
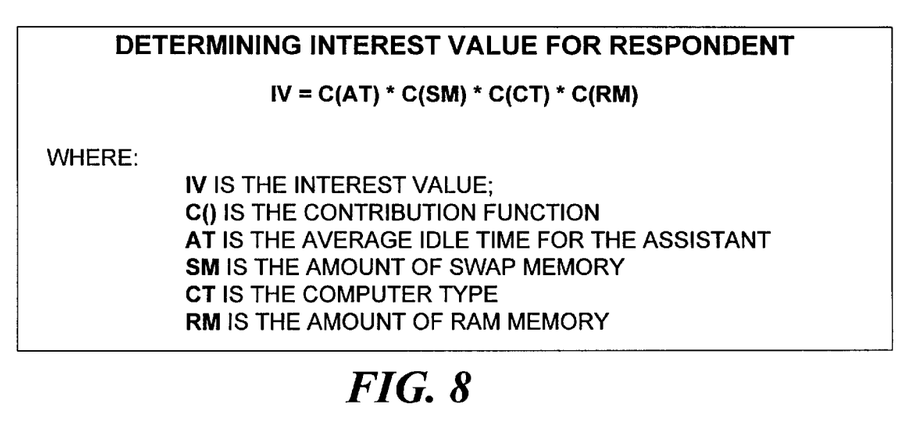
FIG. 8 is an equation that is used to determine an interest value associated with a computer responding to the request for assistance in solving the computational task as a measure of the computational capabilities of the computer, to enable the dispatcher to select the assisting computers.

FIG. 8 illustrates an equation used for determining the interest value for a responding computer that has indicated it is available to participate in solving a distributed problem. In this equation, a different weighting factor is applied to each of four variable parameters. The weighting factor, C( ), is defined as a contribution function for the indicated parameter. The parameter corresponding to the user profile is the average idle time for the prospective assisting computer, which is a historical parameter determined for each computer on the network. Clearly, a computer that has a longer average idle time between uses by a local operator is more likely to be available to complete its assigned portion of the distributed processing task. Another parameter is the amount of swap memory, i.e., hard disk storage used as virtual memory by the operating system. The amount of swap memory available to a computer can affect the speed with which the computer carries out the rendering process. More available swap memory will (typically) be characteristic of a computer that has a greater amount of hard disk space available for use as virtual memory, once all of the RAM is used. The computer type includes an identification of the processor, number of processors (CPUs) in the computer, and the nominal speed of the processor(s). Clearly, an Intel Corporation Pentium™ processor running at approximately 166 MHz clock speed can implement a rendering task substantially faster than a computer having an Intel Corporation type 80486 DX2 processor running at 66 MHz clock speed. Similarly, as noted above, a computer provided with four Intel Corporation type Pentium Pro™ processors running in parallel at 200 MHz clock speed would be preferred over a computer having only a single such processor—for assisting in a distributed processing task such as rendering a portion of an image or an image used in an animation.

The fourth parameter is the amount of RAM installed in the computer. Generally, for computers running under Microsoft Corporation's Windows NT™ operating system, at least 16 MBytes of installed RAM is required, and additional RAM provides an improved efficiency in executing complex tasks such as rendering an image. The contribution function or weighting factor assigned to each of these parameters depends on the type of distributed processing task being implemented. For the rendering of an image, which is described above as an example of a distributed processing task, it is likely that the contribution function for the amount of RAM, i.e., RM would be set to about 50%, and for the computer type/number of processors/processor clock speed, all specified by the term CT (e.g., derived from a look-up table), the contribution function would be approximately 25%. The remaining 25% would be allocated equally between the other three parameters.

It is also contemplated that other factors might be considered in selecting assisting computers to participate in a distributed processing task. For example, it would be preferable to use a computer that is located locally as part of a local area network, compared to one that is located at a geographically remote site coupled to the local site by a wide area network. In selecting computers, the problem dispatcher can be set to use only those computers having an interest value in excess of a predefined limit to insure at least a minimum level of efficiency is achieved in solving the task. Furthermore, since a responding computer that is better than all previously responding computers replaces the worst computer in the list of assisting computers, the selection process insures that the more efficient computers responding to a request for assistance are used, thereby tending to optimize the solution of the problem.

In some instances, where the usage rate during the day of all computers on a network is relatively high, it may be preferable to schedule distributed processing tasks for a later point in time. For example, after normal business hours when most local operators have gone home for the day, many more computers on a network are available for assisting in a distributed processing task.

It is also contemplated that different types of tasks may be allocated to different computers based upon their capabilities. For example, a relatively fast computer with a substantial amount of RAM and a large swap file might be assigned the task of rendering an entire scene or a complex portion of a scene, while a plurality of slower computers with less RAM could be assigned the task of rendering different and simpler portions of a scene.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A process for executing a complex computational task on a network having a plurality of independent interconnected workstations, each workstation including a computer processing unit and a user input device, the process comprising the steps of:
   (i) identifying available workstations connected to a dispatching work station having a complex computational task to perform;
   (ii) requesting computational characteristics and a local user profile from the identified workstations;
   (iii) selecting, in response to the respective computational characteristics and local user profiles, at least one of the identified workstations for assisting in execution of the task to achieve a predetermined minimal efficiency;
   (iv) dividing the task, in accordance with the respective computational characteristics and local user profiles, into portions for execution on the at least one selected workstation and the dispatching workstation;
   (v) distributing the portions among the at least one selected workstation and the dispatching workstation; and
   (vi) executing the distributed portions at the irrespective at least one selected workstation and the dispatching workstation to complete the task.

2. A process according to claim 1, wherein the step of identifying available workstations includes determining workstations where a predefined time interval has elapsed since a local user input.

3. A process according to claim 2, wherein the step of identifying includes querying a screen saver application.

4. A process according to claim 1, wherein the computational characterstics include at least one of memory available for execution of the portion, and a type designation of the identified workstation.

5. A process according to claim 1, wherein the local user profile includes an average user idle time.

6. A process according to claim 1, wherein the step of selecting includes choosing the identified workstations to optimize execution of the task.

7. A process according to claim 1, wherein the step of distributing includes determining an optimized distribution of the portions among a plurality of selected workstations in accordance with their respective computational characteristics and local user profiles.

8. A process according to claim 1, further including the steps of:
   (vii) detecting a local user input at the at least one selected workstation; and
   (viii) interrupting execution of the portion executing at the at least one selected workstation in response to the local user input.

9. A process according to claim 8, further including the step of:
   (ix) redistributing the interrupted portion for execution at an unselected available workstation.

10. A method for rendering a graphics project over a network having a directing workstation preparing the graphics project, and a plurality of assistant workstations connected to the directing workstation through the network, each of the directing and assistant workstations including a computer processing unit and a user input device, the method comprising the steps of:
    (i) querying the assistant workstations to determine available assistant workstations;
    (ii) providing to the directing workstation computational characteristics and a local user profile for each of the available assistant workstations;
    (iii) selecting a plurality of the available assistant workstations, according to their respective computational characteristics and local user profiles, to maximize efficiency of a graphics rendering task;
    (iv) apportioning the rendering task among the selected assistant workstations and the directing workstation according to their respective computational characteristics and local user profiles;
    (v) rendering the apportioned rendering task at the selected assistant workstations and directing workstation; and
    (vi) assembling the rendered task at the directing workstation to provide a rendered digital graphics project.

11. A method according to claim 10, wherein the step of querying includes determining assistant workstations where a predefined time interval has elapsed since a local user input.

12. A method according to claim 11, wherein the step of querying includes querying a screen saver application.

13. A method according to claim 10, wherein the computational characteristics include at least one of memory available for execution of the portion, and a type designation of the available assistant workstation.

14. A method according to claim 10, wherein the local user profile includes an average user idle time.

15. A method according to claim 10, wherein the step of selecting includes selecting available assistant workstations to optimize execution of the rendering task.

16. A method according to claim 10, wherein the step of apportioning includes optimizing execution of the rendering task in accordance with the computational characteristics and local user profiles of the selected assistant workstations.

17. A method according to claim 10, further including the steps of:
    (a) detecting a local user input at one of the selected assistant workstations;
    (b) interrupting execution of the portion of the rendering task apportioned to the detected assistant workstation; and
    (c) assigning the interrupted portion for execution at an unselected available assistant workstation.

18. A system for processing a complex computational task among a plurality of independent workstations interconnected over a network, each workstation including a computer processing unit and a user input device, comprising:
    a dispatcher for transmitting a request to workstations connected to a dispatching workstation having a complex computational task to perform;
    an inactivity detector at each said workstations for receiving the request and providing an availability response if a local user idle time exceeds a predefined time;
    selection means at the dispatcher for requesting processing characteristics and a local user profile from available workstations, and for selecting, in response to the respective computational characteristics and local user profiles, at least one of the available workstations for assisting in execution of the task with at least a predetermined minimal efficiency; and
    apportioning means at the dispatcher for dividing the task into portions for execution on the at least one selected workstation and the dispatching workstation, and for distributing the portions among the at least one selected workstation and the dispatching workstation.

19. A system according to claim 18, wherein the inactivity detector includes a screen saver application.

20. A system according to claim 18, wherein the computational characteristics include at least one of memory available for execution of the portion, and a type designation of the available assistant workstation.

21. A system according to claim 18, wherein the local user profile includes an average user idle time.

22. A system according to claim 18, further including a user input detector for detecting a user input at the at least one selected workstation.

23. A system according to claim 22, further including a interrupter for interrupting execution of the portion when a user input is detected.

24. A system according to claim 23, wherein the apportioning means assigns the interrupted portion to an unselected available workstation.

25. A system according to claim 18, wherein the complex computational task is a graphics rendering task.

26. A graphics rendering system, comprising:
    a directing workstation having a graphics rendering task to perform;
    a plurality of assistant workstations connected to the directing workstation through a network, each of the directing and assistant workstations including a computer processing unit and a user input device;
    a dispatcher at the directing workstation for transmitting an assistance request to the assistant workstations;
    an inactivity detector at each said assistant workstations for receiving the request and providing an availability response if a local user idle time exceeds a predefined interval;
    selection means at the dispatcher for requesting processing characteristics and a local user profile from available assistant workstations, and for selecting, in response to the respective computational characteristics and local user profiles, at least one of the available workstations for assisting in execution of the rendering task with at least a predetermined minimal efficiency;

apportioning means at the dispatcher for dividing the task into portions for execution on the at least one selected workstation and the dispatching workstation, and for distributing the portions among the at least one selected workstation and the dispatching workstation; and assembling means for assembling the executed portions to form rendered graphics project.

27. A rendering system according to claim 26, wherein the inactivity detector includes a screen saver application.

28. A rendering system according to claim 26, wherein the computational characteristics include at least one of memory available for execution of the portion, and a type designation of the available assistant workstation.

29. A rendering system according to claim 26, wherein the local user profile includes an average user idle time.

30. A rendering system according to claim 26, further including a user input detector for detecting a user input at the at least one selected workstation.

31. A rendering system according to claim 30, further including a interrupter for interrupting execution of the portion when a user input is detected.

32. A rendering system according to claim 31, wherein the apportioning means assigns the interrupted portion to an unselected available workstation.

* * * * *